(12) United States Patent  
Himberger et al.

(10) Patent No.: US 8,191,137 B2
(45) Date of Patent: May 29, 2012

(54) SYSTEM AND METHOD FOR IDENTIFICATION AND BLOCKING OF MALICIOUS USE OF SERVERS

(75) Inventors: Kevin D. Himberger, Durham, NC (US); Benjamin M. Parees, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 12/182,633

(22) Filed: Jul. 30, 2008

(65) Prior Publication Data

US 2010/0031362 A1    Feb. 4, 2010

(51) Int. Cl.
*G06F 11/00* (2006.01)
(52) U.S. Cl. .............................. 726/22; 726/23; 726/24
(58) Field of Classification Search .............. 726/22–26, 726/11–12; 713/150, 153–154, 188; 709/223–225
See application file for complete search history.

(56) References Cited

U.S. PATENT DOCUMENTS

| | | | |
|---|---|---|---|
| 7,111,325 B2 | 9/2006 | Keohane et al. | |
| 7,313,691 B2 | 12/2007 | Bantz et al. | |
| 7,562,304 B2 * | 7/2009 | Dixon et al. | 715/738 |
| 7,958,555 B1 * | 6/2011 | Chen et al. | 726/22 |
| 2004/0250124 A1 | 12/2004 | Chesla et al. | |
| 2007/0118669 A1 | 5/2007 | Rand et al. | |
| 2007/0180090 A1 | 8/2007 | Fleischman et al. | |

OTHER PUBLICATIONS

Hacquebord et al., "Can You Trust Your DNS?" Virus Bulletin 2007, Sep. 24, 2007; http://www.virusbtn.com/pdf/conference_slides/2007/HacquebordVB2007.pdf.
"DNS Cache Poisoning" wikipedia, printed Dec. 10, 2007; http://en.wikipedia.org/wiki/DNS_cache_poisoning.
"Microsoft Security Bulletin MS07-062—Important Vulnerability in DNS Could Allow Spoofing", published Nov. 13, 2007http://technet.microsoft.com/en-us/security/bulletin/ms07-062.

* cited by examiner

*Primary Examiner* — Hosuk Song
(74) *Attorney, Agent, or Firm* — Arthur J. Samodovitz

(57) ABSTRACT

A system and method to protect web applications from malicious attacks and, in particular, a system and method for identification and blocking of malicious DNS servers. The system includes a central processing unit and first program instructions. The first program instructions identify a rogue Domain Name Service (DNS) by identifying that a DNS metric is outside a historical limit. The first program instructions are stored on the computer system for execution by the central processing unit.

7 Claims, 2 Drawing Sheets

SYSTEM AND METHOD FOR IDENTIFICATION AND BLOCKING OF MALICIOUS USE OF SERVERS

FIELD OF THE INVENTION

The invention generally relates to a system and method to protect users from malicious applications and, in particular, a system and method for identification and blocking of malicious uses of Domain Name Service (DNS) servers.

BACKGROUND

Malicious attacks on computing systems is becoming an ever-increasing security concern to companies and individuals. The most common pathway for malicious attacks is through the Internet, vis-a-vis the World Wide Web. Malicious attacks come in many different forms designed to infiltrate a computer system without the owner's informed consent. For example, malicious attacks can include computer viruses, worms, and trojan horses, as well as other malicious and unwanted software. In addition, malicious parties use rogue Domain Name Service (DNS) servers to steal sensitive information, commit identity theft and destroy data. These latter types of attacks continue because there are no standards for how users should access DNS services nor any security inherent in the service.

There are several classes of DNS attacks. One example of a DNS attack is a man in the middle (MitM) class attack. In the case of MitM attacks, a malicious party will have access to the communication between the user and the DNS server. Because DNS requests are not usually encrypted/signed/etc, the attacker is able to intercept the data surreptitiously and then block communication to the legitimate DNS server. The illegitimate DNS server responds to the user as if it was the legitimate DNS server. In this case, the user cannot tell the difference, and is sent to a rogue website disguising itself as the requested site. The rogue website collects the user's login information and other data and sends it to an identity thief.

In another class of attacks, an attacker tricks the user into reconfiguring their system to use some other DNS through social engineering or a trojan horse. The new DNS is controlled by the attacker and can reroute the user to any site the attacker chooses. Most users never look at their settings close enough to know what DNS server they should be utilizing, hence, if it is changed to a malicious DNS server, the user will probably never know. Once again when the user tries to request the IP address of a certain website, they will instead be directed to whatever site the owner of the rogue DNS desires.

One existing solution to these problems is the use of a database of known "rogue" sites. This allows a user's browser to identify such rogue sites when they are directed to a false website. Once identified, the user can be alerted that the site is not what it appears and that there may be some security concerns. This solution is clearly limited due to its reliance on a database which will be perpetually incomplete and out of date. Also, it is a reactive rather than proactive solution.

Another approach is for users to enter IP addresses directly rather than relying on blackbox DNS lookups in order to ensure the values are valid. This solution has obvious drawbacks in terms of data entry errors, time required, and complexity of managing and memorizing IP addresses.

Accordingly, there exists a need in the art to overcome the deficiencies and limitations described hereinabove.

SUMMARY

In a first aspect of the invention, a computer system comprises a central processing unit and first program instructions. The first program instructions identify a rogue Domain Name Service (DNS) by identifying that a DNS metric is outside a historical limit. The first program instructions are stored on the computer system for execution by the central processing unit.

In another aspect of the invention, a method for preventing use of a rogue DNS server. The method comprises providing a computer infrastructure operable to identify the rogue DNS server by detecting a DNS metric comprising at least one of a redirect responses sent by the rogue DNS server and a response time to a request for an IP address is outside of a set limit.

In another aspect of the invention, a computer program product is provided for protecting web applications from malicious attacks. The computer program product comprises: a computer readable medium; first program instructions to determine that a current DNS server is a historical DNS server; second program instructions to determine a response time of a connected to DNS server; third program instructions to determine a redirection of a response to another DNS server; fourth program instructions to calculate a difference between historical and current ping times and historical and response times and the response time of the connected to DNS server; and fifth program instructions to take action when at least one of: the first program instructions finds the current DNS server to be different than the historical DNS server; the third program determines that there is a redirection to the another DNS server and the redirection is outside a set limit of redirections; the fourth program instructions calculate a difference between the historical and current ping times and the historical and current response times that is greater than a set limit. The first, second, third, fourth and fifth program instructions are stored on the computer readable media.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
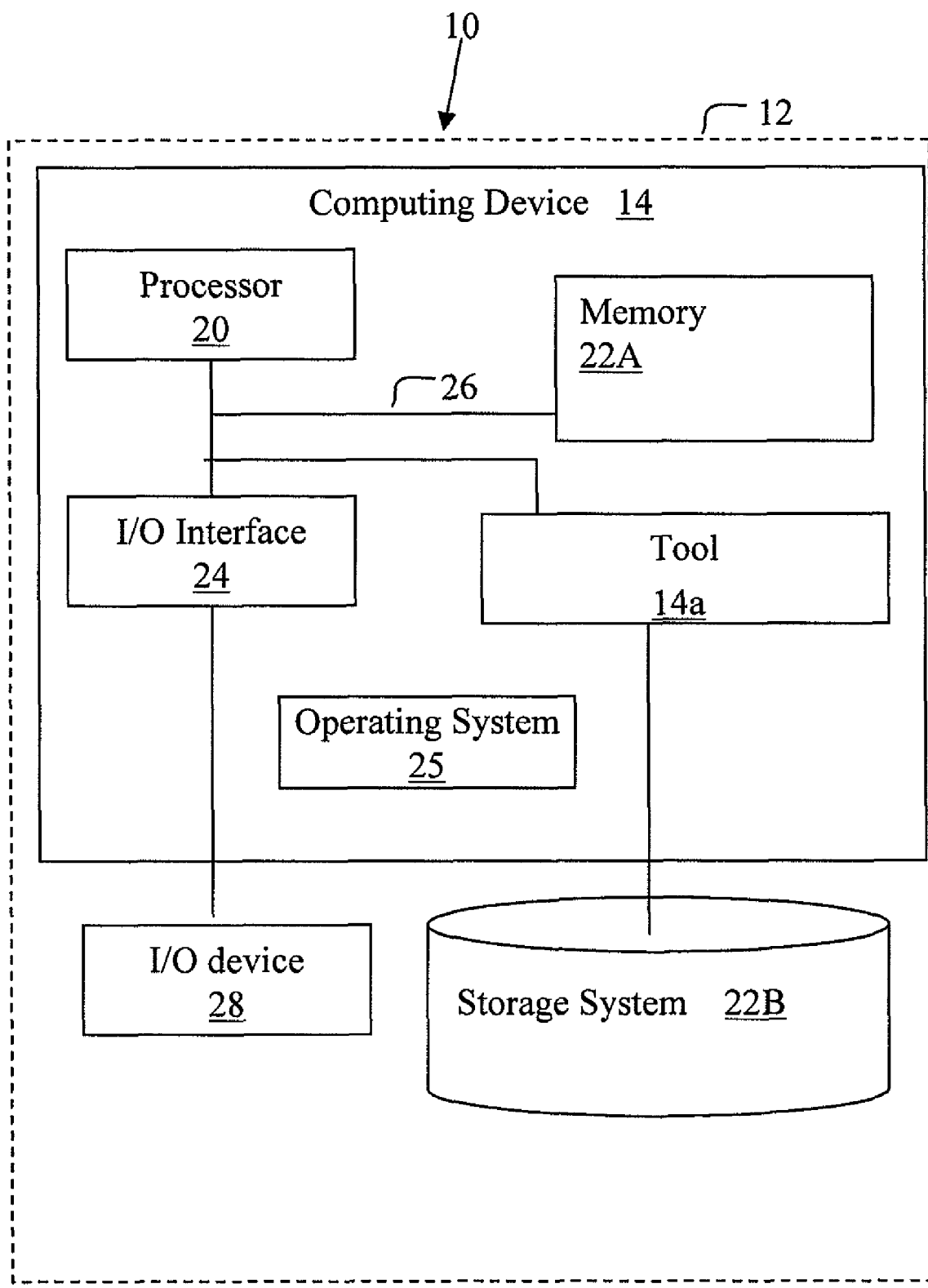
FIG. 1 shows an illustrative environment for implementing the steps in accordance with the invention.

The invention generally relates to a system and method to protect users from malicious applications and, in particular, a system and method for identification and blocking of anomalous (potential malicious) uses of Domain Name Service (DNS) servers. In specific, the invention is particularly well-suited to prevent MitM class attacks as well as an attacker tricking a user into reconfiguring their system to use some other DNS through social engineering or a trojan horse, for example. Advantageously, by detecting rogue DNS servers, it is possible to block potential malicious attacks and more particularly, prevent identity theft, destruction of data and other fraudulent activities. Also, in implementing the present invention, no changes to the existing infrastructure (protocols, clients, servers, etc.) are required to detect and block the rogue DNS servers.

In implementation, the present invention exploits certain limitations of the rogue DNS servers in order to detect the rogue DNS servers. For example, DNS servers are pillars to distributed computing because they allow users across the Internet to pull current data without having to know the answer. The DNS server can pull data by utilizing created caches of data from previous requests and querying peer DNSs or TLDs when the cache misses. In response to a request, DNS servers take one of the following actions:

(1) Answer the request with an IP address because it has the IP address for the domain in its cache;
(2) Contact another server to find the IP address for the name requested. This can be done multiple times;
(3) Respond to the requester noting that the server does not know the IP address for the requested domain, but provide an IP address for a server that may know the IP address; and/or
(4) Return an error message because the requested domain name is invalid or does not exist.

Rogue DNS servers, though, may not have enough cached data such that it may take a very long time for it to respond to the request. For example, since rogue servers are put on the Internet to make money instead of serving general DNS services, they typically do not receive the same level of requests as a typical DNS server. That is, they will only serve requests to a limited population of users; those machines redirected by the attacker to illegitimate DNS. Therefore their caches will be less complete than the cache of a legitimate DNS which serves many more requests. The present invention exploits this limitation in order to detect the rogue DNS, as discussed in more detail herein.

EXEMPLARY SYSTEM ENVIRONMENT AND INFRASTRUCTURE

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus or device. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device, and/or In the context of this document, a computer-usable or computer-readable medium may be any medium that can store, the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a DNS Request Validation Service Tool (module or program code) 14a configured to make computing device 14 operable to perform the services described herein. The DNS Request Validation Service Tool 14a can be implemented as one or more program codes stored in memory 22A as separate or combined modules.

In an illustrative example, the DNS Request Validation Service Tool 14a is configured to identify and detect malicious DNS servers by measuring their response times to DNS requests and comparing current response times with historical response times. In embodiments, malicious DNSs will have higher response times because they will not have cached a large portion of the DNS space, unlike a legitimate DNS server which, due to the higher number and more diverse set of requests it will have served, will have a more complete cache. For example, malicious DNSs will have to either perform an additional lookup to resolve the request or redirect the user to another DNS that is able to resolve the request, either of which will have higher response times than a legitimate DNS server. Thus, in implementing the present invention, a malicious DNS can be detected due to the increased lag time and/or increased number of redirections issued to users.

An advantage of the approach of the present invention is that it does not require any changes to existing infrastructure (protocols, clients, servers, etc.). Another advantage is that it provides a generalized solution to the problem which does not rely on maintaining databases of rogue sites/servers, as such databases typically end up out of date before they are useful. As phishing sites stay up for an average of 3.5 days, such a lifespan makes maintaining a database of such sites ineffective.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28, the storage system 22B and operating system 25. For example, the I/O device 28 can comprise any device that enables an individual to interact with the computing device 14 or any device that enables the computing device 14 to communicate with one or more other computing devices using any type of communications link.

The external I/O device/resource 28 may be for example, the handheld device. The operating system 25 can be any known operating system.

In general, the processor 20 executes computer program code such as the DNS Request Validation Service Tool 14a, which can be stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing device capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing device that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

EXEMPLARY PROCESSES

Figure 2:
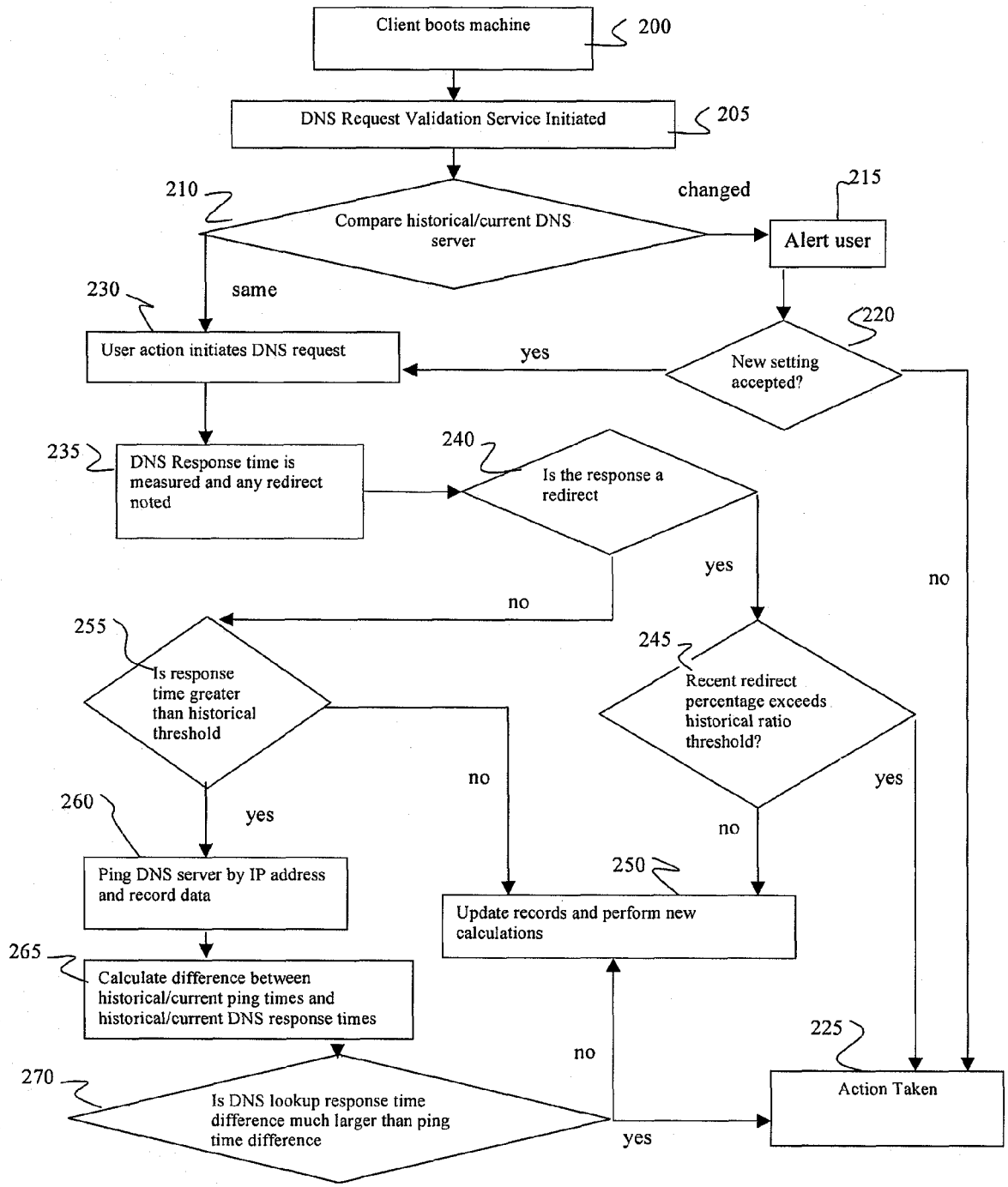
FIG. 2 shows a flow chart of exemplary processes in accordance with aspects of the invention.

FIG. 2 illustrates exemplary processes in accordance with the present invention. The steps of FIG. 2 may be implemented on the computer infrastructure of FIG. 1, for example. The flowchart and/or block diagram in the Figure illustrates the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above.

At step 200, a user boots the machine, e.g., computer. At step 205, the program control initiates the services of the present invention. That is, at step 205, a DNS Request Validation Service is initiated. As discussed herein, the DNS Request Validation Service Tool will determine if a DNS server is a legitimate or illegitimate DNS server. At step 210, the DNS Request Validation Service Tool makes a comparison between the historically known DNS server (e.g., the previously connected to server) and the current DNS server. That is, the DNS Request Validation Service Tool will make a determination as to whether the DNS server configuration has changed to a new DNS server. If there is a change from the historic DNS server, the DNS Request Validation Service Tool will alert the user of the change, at step 215.

At step 220, the program control makes a determination as to whether the user has accepted the change, e.g., new setting. If the user did not accept the change, at step 225, some action is taken. This action may be, for example, the DNS Request Validation Service Tool would prevent any traffic to the IP address contained in the DNS response that generated the alert. The action can, in addition or alternatively, include the prevention of any traffic to the DNS server that provided the IP address. Alternatively or in addition, the action may include providing a dialog to the user, warning of the potential security threats.

If the user accepts the new setting, at step 230, user action will initiate the DNS request. The DNS Request Validation Service Tool can also clear and/or reset the historical data. At step 235, the DNS Request Validation Service Tool measures the DNS response behavior, e.g., how long it takes to receive a response time and any redirection noted. In embodiments, the response time can be measured using different metrics such as, for example, a time to:

(1) Answer the request with an IP address from its cache;
(2) Contact another server to find the IP address for the name requested;
(3) Respond to the requestor noting that it does not know the IP address for the requested domain, but provide an IP address for a server that may know the IP address; and/or
(4) Return an error message because the requested domain name is invalid or does not exist.

At step 240, the DNS Request Validation Service Tool makes a determination as to whether the response is a redirect, e.g., directing the request to another DNS server. If the response is a redirect, at step 245, the DNS Request Validation Service Tool will make a determination as to whether the redirect exceeds a certain threshold. More specifically, the DNS Request Validation Service Tool will determine whether the redirect is above or below a historical limit such as, for example, 20% above or below a known number of times that the DNS server has historically redirected requests to another DNS server.

It should be understood that the present invention is not limited to 20% above or below a historical level of redirects, and that the present invention contemplates other limits. Additionally, those of skill in the art should understand that the processes described herein could equally be based on positive or negative differences in redirects and response time. As such, the processes of the present invention are designed to observe differences (e.g., either positive or negative) in DNS response behavior, and anything significantly outside the normal behavior, either faster or slower, indicates a change in which DNS is being communicated with and should be flagged.

If the number or redirects is above or below the set limit, say about 20%, for example, the DNS Request Validation Service Tool will continue to step 225. At step 225, the DNS Request Validation Service Tool will take action. If, at step 245, the number of redirects does not trigger an action, e.g., is within the set limit, the DNS Request Validation Service Tool will update its records and perform new calculations of the historically redirected requests at step 250.

Referring back to step 240, if the response is not a redirect, the DNS Request Validation Service Tool will proceed to step 255. At step 255, the DNS Request Validation Service Tool will make a determination as to whether the response time is greater than a historical response time. More specifically, the DNS Request Validation Service Tool will determine whether the response time is above or below a historical set limit such as, for example, 20% above or below a historical response time, based on one or more of the above noted metrics. Again, it should be understood that the present invention is not limited to 20% above or below a historical response time, and that the present invention contemplates other limits. In embodiments, the time violation limit should be set as low as possible in order to prevent a rogue DNS server from being utilizing before it is detected. Setting the value too low, e.g., 5 milliseconds, may run the risk, though, of presenting the user with a false positive when outlier response times occur in the natural course of events.

If the response time falls within the acceptable range of the historical data, the value is added to the history and the response is considered valid. The process then continues at step 250. If the response time does not fall within the acceptable range, e.g., above or below the set limit, the DNS Request Validation Service Tool will continue to step 260. At step 260, the DNS Request Validation Service Tool will ping the DNS server by IP address to check for network congestion/topology changes and compare such time to historical values. The ping time can be recorded. A ping might take about 5 to 10 milliseconds; whereas, the DNS response time might be about 100 milliseconds.

At step 265, the DNS Request Validation Service Tool will calculate the difference between the historical and current ping times and the historical and current DNS response times. At step 270, the DNS Request Validation Service Tool will make a determination as to whether the DNS response time difference is significantly larger than the ping time difference. A significant difference in DNS response time which is not accounted for by a corresponding change in ping time indicates a potential anomaly such as for example about 90 milliseconds or another threshold. A difference in DNS response time which is matched by a similar change in ping time indicates the difference is due to changes in network latency and is not anomalous. If the DNS response time difference is much larger than the ping time difference, the DNS Request Validation Service Tool will take action at step 225. If the DNS lookup time difference is not much larger than the ping time difference, the DNS Request Validation Service Tool will continue to step 250.

In embodiments, the processes of FIG. 2 can be modified to place no emphasis on recording data on a "per DNS" server basis. In other words, all data recorded is historical with no regard to legitimate changes in DNS server. The underlying assumption being that legitimate DNS servers (both primary and secondary) would have reasonably similar response times and malicious/rogue DNS servers would not have the same response.

Additionally, as an example of an alternate embodiment, the following assumptions may be made:
  Normal DNS request time: dnsTn: 20 ms
  Normal ping time: pingTn: 10 ms
  Anomalous DNS request time: dnsTa: 200 ms
  Anomalous ping time: pingTa: 100 ms
  Second DNS request attempt: dnsT2: x Normal DNS response and ping times are calculated from observed values. When an anomalous time is observed based upon the variable threshold, a second request is sent to the DNS server to get another response time. This response time of the second request to the DNS server will be known as "x".

If "x" is approximately equal to dnsTa and pingTn is approximately equal to pingTa, it can be assumed that the DNS server is under heavy load because network congestion is at a normal level, but the response time is consistently significantly different than normal. If "x" is significantly lower than dnsTa and pingTn is approximately equal to pingTa, it can be assumed that the DNS is rogue because it has now updated its cache with the first request and responded more quickly because of that cache entry. If "x" is significantly lower than dnsTa and pingTa is significantly lower than pingTn, we can assume network load was high and has since decreased.

In the case that the rogue DNS had the initial request in its cache, "x" will not be significantly lower and there will be a false negative. The rogue server will not be detected by this DNS request. However, the rogue DNS will eventually be noticed when a DNS request is submitted, which is not in its cache. An additional heuristic for determining if the DNS has changed is to use an nmap-style algorithm to fingerprint the operating system and server of the remote DNS server. If this information changes, warnings would be provided.

In embodiments of the invention, the system of the present invention measures latency measurement of a network by sending requests to peer nodes of a DNS server. The system can check latency by sending and receiving data to and from network devices on a same network as the DNS server or other network devices (e.g., before the DNS server, in the flow of traffic). The system can also compare response times by comparing to historical values for the request in order to establish latency to a DNS home network.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer system for detecting a fraudulent domain name service (DNS) server, the computer system comprising:
  a central processing unit;
  a computer-readable tangible storage device; and
  program instructions to detect a frequency at which requests sent by the computer system to a first DNS server are redirected to another DNS server; and
  program instructions to compare the frequency to a predetermined threshold, and determine that the first DNS server is fraudulent based in part on the frequency exceeding the predetermined threshold; and
  wherein the program instructions to detect and the program instructions to determine are stored on the computer-readable tangible storage device for execution by the central processing unit.

2. The computer system of claim 1, further comprising:
program instructions to determine if the first DNS server is different than a prior DNS server to which the computer system previously sent requests for the domain name service; and wherein
the program instructions to determine that the first DNS server is fraudulent also bases the determination that the first DNS server is fraudulent on whether the first DNS server is different than the prior DNS server to which the computer system previously sent requests for the domain name service; and
the program instructions to determine if the first DNS server is different than a prior DNS server is stored on the computer-readable tangible storage device for execution by the central processing unit.

3. A computer system comprising:
a central processing unit;
one or more computer-readable tangible storage devices;
program instructions to identify a rogue Domain Name Service (DNS) server in part by determining that a response time metric is outside a historical range by:
sending requests to peer nodes of the DNS server and measuring response times to the requests to the peer nodes,
sending data to and receiving data from network devices on a same network as the DNS server and measuring response times to the data which was sent to the network devices, and
comparing current instances of the response times to the requests to the peer nodes and to the data which was sent to the network devices to respective historical ranges of the response times to the requests to the peer nodes and the data which was sent to the network devices; and
wherein the program instructions are stored on the one or more computer-readable tangible storage devices for execution by the central processing unit.

4. The method of claim 3, wherein the requests to the peer nodes are pings.

5. The method of claim 3, wherein the response times to the requests to the peer nodes are calculated from at least one of: an answer to a request with an IP address from cache; a contact with another server in an attempt to find the IP address; an answer with an IP address for a name server that may know the IP address; and a return of an error message because a requested domain name is invalid or does not exist.

6. A computer program product for detecting a fraudulent domain name service (DNS) server, the computer program product comprising:
one or more computer-readable tangible storage devices and program instructions stored on at least one of the one or more storage devices, the program instructions comprising:
program instructions to detect a frequency at which requests sent by the computer system to a first DNS server are redirected to another DNS server; and
program instructions to compare the frequency to a predetermined threshold, and determine that the first DNS server is fraudulent based in part on the frequency exceeding the predetermined threshold.

7. The computer program product of claim 6, further comprising:
program instructions, stored on at least one of the one or more storage devices, to determine if the first DNS server is different than a prior DNS server to which the computer system previously sent requests for the domain name service; and wherein the program instructions to determine that the first DNS server is fraudulent also bases the determination that the first DNS server is fraudulent on whether the first DNS server is different than a prior DNS server to which the computer system previously sent requests for the domain name service.

* * * * *